United States Patent
Pelletier et al.

(10) Patent No.: US 7,289,497 B2
(45) Date of Patent: Oct. 30, 2007

(54) IMPLICIT PACKET TYPE IDENTIFICATION

(75) Inventors: Ghyslain Pelletier, Lulea (SE); Lars-Erik Jonsson, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1209 days.

(21) Appl. No.: 10/124,088

(22) Filed: Apr. 15, 2002

(65) Prior Publication Data

US 2003/0009663 A1    Jan. 9, 2003

Related U.S. Application Data

(60) Provisional application No. 60/302,957, filed on Jul. 3, 2001.

(51) Int. Cl.
*H04L 17/28* (2006.01)
*H04L 17/56* (2006.01)

(52) U.S. Cl. .................... 370/389; 370/477

(58) Field of Classification Search ........... 370/466, 370/467, 468, 389, 254, 152, 349, 338, 392, 370/477, 521
See application file for complete search history.

(56) References Cited

U.S. PATENT DOCUMENTS

| | | | |
|---|---|---|---|
| 6,967,964 B1 * | 11/2005 | Svanbro et al. | 370/437 |
| 2002/0097701 A1 * | 7/2002 | Lupien et al. | 370/338 |
| 2005/0160184 A1 * | 7/2005 | Walsh et al. | 709/247 |
| 2005/0286523 A1 * | 12/2005 | Liao et al. | 370/389 |

OTHER PUBLICATIONS

Cellatoglu, A. et al., "Robust Header Compression for Real-Time Services In Cellular Networks", Second International Conference on 3G Mobile Communication Technologies (Conf. Publ. No. 477), Proceedings of 3G 2001 International Conference On 3G Mobile Communication Technologies, London, UK, Mar. 26-28, 2001, (pp. 124-128).

Svanbro, K. et al., "Wireless Real-time IP Services Enabled by Header Compression", VTC2000-Spring, 2000 IEEE 51st Vehicular Technology Conference Proceedings (CAT. No. 00CH37026), 2000 IEEE 51st Vehicular Technology Conference Proceedings, VTC2000-Springer, Tokyo, Japan, May 15-18, 2000, (pp. 1150-1154).

Larzon, L., et al., "Efficient Transport of Voice over IP over Cellular links", Globecom '00-IEEE, Global Telecommunications Conference, Conference Record (CAT. No. 00CH37137), Proceedings of Global Telecommunications Conference, San Francisco, CA, Nov. 27-Dec. 2000, (pp. 1669-1676).

(Continued)

*Primary Examiner*—Ajit Patel

(57) ABSTRACT

In a system for transmitting packets over a link between a compressor and a decompressor, a method is provided for implicit packet type identification. A set of implicit packet transmission characteristics including at least first and second characteristics is selected, and the compressor is operated to assign the first and second transmission characteristics to packets of first and second packet types, respectively. The decompressor is operated to detect transmission characteristics of packets received by the decompressor, and to thereby identify a received packet as being either a first or second packet type. Usefully, header free packets comprise one of the packet types.

39 Claims, 2 Drawing Sheets

OTHER PUBLICATIONS

International Search Report prepared by the European Patent Office for PCT/SE02/01267, as completed Oct. 25, 2002, (2 pgs.).

V. Jacobson, *Compressing TCP.IP Headers for Low-Speed Serial Links*, IETF RFC 1144, IETF Network Working Group, Feb. 1990.

M. Degermark, et al., *IP Header Compression*; IETF RFC 2507, IETF Network Working Group, Feb. 1999.

S. Casner, et al., *Compressing IP/UDP/RTP Headers for Low-Speed Serial Linds*, IETF RFC 2508, IETF Network Working Group, Feb. 1999.

C. Bormann, et al., *Robust Header Compression (ROHC)*, IETF RFC 3095, Apr. 2001.

L. Jonsson, et al., *A Link-Layer Assisted ROHC Profile for IP/UDP/RTP*, Internet Draft, <draft-jonsson-rohc-11a-rtp-00.txt>, Feb. 2001.

* cited by examiner

IMPLICIT PACKET TYPE IDENTIFICATION

CROSS REFERENCE RELATED APPLICATION

This application for patent claims the benefit of priority from, and hereby incorporates by reference the entire disclosure of, U.S. provisional application for patent Ser. No. 60/302,957 now abandoned, filed Jul. 3, 2001.

BACKGROUND OF THE INVENTION

The invention disclosed and claimed herein generally pertains to a method for identifying packet type in a system wherein data is transmitted over a link by means of packets. More particularly, the invention pertains to a method of the above type wherein the headers of at least some of the packets are subjected to 0-byte compression prior to transmission, so that the packets are header free and packet type must be identified implicitly. Even more particularly, the invention pertains to a method of the above type which is particularly well adapted for use with narrow band links, such as cellular and wireless links.

Due to the great success of the Internet, it has become a challenging task to make use of the Internet Protocol (IP) over many different kinds of links. However, because the headers of the IPs are rather large, it can be difficult to use IPs in connection with narrow band links such as wireless and cellular links. For example, for ordinary speech data transported by the ordinary protocols (IP, UDP, RTP) the header may represent about 70% of the packet. This results in a very inefficient usage of the link.

The term header compression (HC) refers to the art of minimizing the necessary bandwidth for information carried in headers on a per-hop basis over point-to-point links. HC techniques in general have a more than 10-year-old history within the Internet community, and several commonly used protocols exist such as RFC 1144 (hereinafter "VJ", set forth in a document prepared by Van Jacobson, et al, entitled "Compressing TCP/IP Headers for Low-Speed Serial Links," IETF RFC 1144, IETF Network Working Group, February 1990); RFC 2507 (hereinafter "IPHC", set forth in a document by Degermark, Nordgren and Pink, entitled "IP Header Compression," IETF RFC 2507, IETF Network Working Group, February 1999); and RFC 2508 (hereinafter "CRTP", set forth in a document by Casner and Van Jacobson, entitled "Compressing IP/UDP/RTP Headers for Low-Speed Serial Links", IETF RFC 2508, IETF Network Working Group, February 1999).

Header compression takes advantage of the fact that some fields in the headers do not change within a flow, or else change with small and/or predictable values. Accordingly, header compression schemes send static information only initially, while fields that change are sent with their absolute values or as differences from packet-to-packet. Completely random information must, of course, be sent without any compression at all. The header compression scheme can usually be realized as a state machine, and a challenging task associated with compression is keeping the compressor and decompressor states (called contexts) consistent with each other, while keeping the header overhead as low as possible.

It will be readily apparent that header compression is very important in making Voice over IP (VoIP) over Wireless (VoIPoW) an economically feasible alternative to circuit switched voice. Header compression solutions for this purpose have been developed by the Robust Header Compression (ROHC) Working Group of IETF. These solutions are set forth in a document authored by Bormann, et al., entitled "Robust Header Compression," IETF RFC 3095, July 2001. The ROHC RTP header compression scheme has been designed to efficiently compress the IP/UDP/RTP headers over an arbitrary link layer. Except for negotiation, ROHC RTP compression requires only that framing and error detection be provided by the link layer, while all other functionality, such as packet type identification, is handled by the ROHC scheme itself.

Recent efforts in header compression further include the creation of 0-byte header compression schemes for IP/UDP/RTP packets. Schemes of this type are described, for example, in a document by Jonsson, et al., entitled "A Link-Layer Assisted ROHC Profile for IP/UDP/RTP," RFC 3242 April 2002 (hereinafter "LLA"). Such schemes use functionality provided by the lower layer to increase compression efficiency by completely eliminating the header for most packets during normal operation. These header free packets can be sent when some of their information may be inferred by the functionality provided by the assisting layer. This information includes the field of the header that identifies packet type.

Even though header free packets may now be provided by schemes such as LLA, a packet type identifier is still always needed in all headers compressed using the ROHC technique, thereby requiring a minimal header size of one octet. Thus, the provision of packet type identification without the explicit use of additional bits over the air interface becomes problematic, and the use of 0-byte header compression schemes will be hindered until this problem can be solved. To completely eliminate the header, a packet type identifier must therefore be provided through other means, to be used when a "free" link layer bit is not available and when the transmission of additional bits is not possible.

SUMMARY OF THE INVENTION

The invention overcomes the problems of the prior art set forth above by providing packet type identification in an arrangement where the packet header has been completely eliminated by compression, so that the packet after compression is header free. More particularly, in embodiments of the invention packet type identification is done implicitly, by using functionality provided by the physical layer without introducing the need for transmitting additional bits over the air interface or other transmission link. In accordance with the invention, several solutions are proposed to create header compression schemes capable of compressing away the headers completely, useful when the link cannot provide an explicit packet type identifier. Each of these solutions is described hereinafter in further detail.

It is anticipated that embodiments of the invention can be advantageously used with the header compressing schemes respectively referred to above as [VJ], [IPHC], [CRTP] and [ROHC]. Additionally, it is anticipated that very important advantages may be achieved by combining an embodiment of the invention with 0-byte header compression schemes such as [LLA]. However, the invention is by no means limited thereto. Use of the generic terms header compression, header compressor and header decompressor herein is intended to emphasize the broad scope of the invention.

One embodiment of the invention is directed to a method of implicit packet type identification for use with a system disposed to transmit packets provided at least initially with headers over a transmission link, wherein the system comprises a compressor and decompressor for respectively compressing headers before and decompressing headers after transmission. The method includes the step of establishing or selecting a set of implicit packet transmission characteristics, wherein different characteristics identify packets of different types. The compressor is operated to compress the header of a particular packet so that the particular packet becomes header free, the particular packet being of a type identified by a corresponding one of the characteristics. The particular packet is transmitted in accordance with the corresponding transmission characteristic, and the decompressor is operated to detect the corresponding characteristic and to thereby identify the packet type of the particular packet. It is to be emphasized that embodiments of the invention could be used to identify N different packet types, where N is a positive integer.

As used herein, the term "implicit packet transmission characteristic" refers to a characteristic or mechanism associated with the transmission of both header free and compressed header packets through a link, from the compressor side to the decompressor side, wherein the implicit characteristic can be varied for different packet types and does not require any additional bits.

DETAILED DESCRIPTION OF EXEMPLARY EMBODIMENTS

Figure 1:
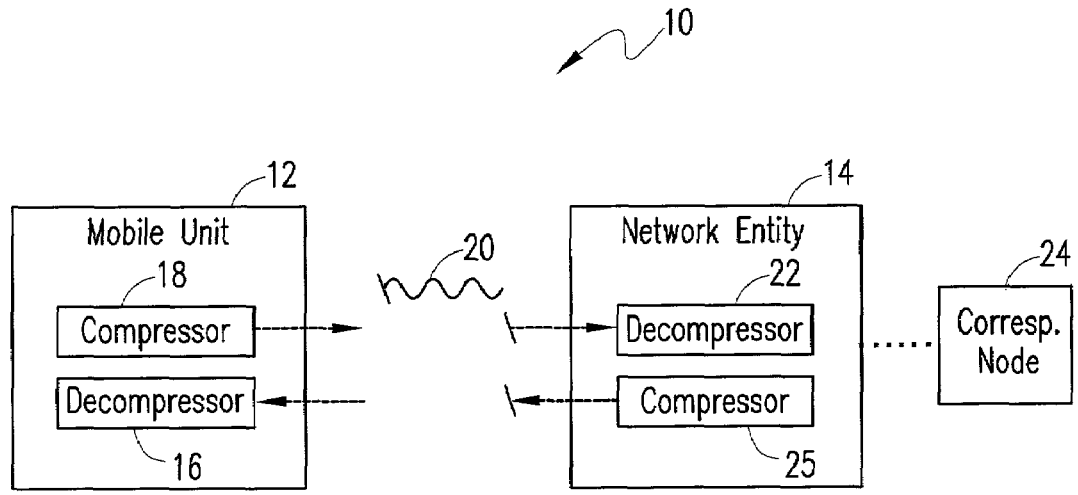
FIG. 1 is a schematic diagram showing a system using header compression and implicit packet identification in accordance with an embodiment of the invention.

Referring to FIG. 1, there is shown a system 10 which uses an embodiment of the invention in transmitting information such as voice or speech information from a mobile unit 12 to a network entity 14. Speech data generated at mobile unit 12 packetizes the data in accordance with conventional practice, provides respective packets with headers and delivers the packets to compressor 18 of mobile unit 12. Compressor 18 compresses the headers and operates further as described herein. After compression, packets are transmitted to decompressor 22 of network entity 14 over a wireless link 20 and processed as likewise described hereinafter. Link 20 may usefully be a duplex link having feedback packets transmitted from decompressor 22 to compressor 18 in a conventional manner. This enables the compressor and decompressor to pre-negotiate characteristics or mechanisms of packet transmission, before the packets are sent over link 20. However, while a duplex link generally makes things simpler and can improve performance, such as for header compression, link 20 can alternatively be a simplex link. It might still be possible to perform negotiation in a duplex way even if the data transmission is simplex, or else negotiation might be done offline. As used herein, negotiation or pre-negotiation between the compressor and decompressor refers to a conventional procedure wherein the compressor and decompressor communicate back and forth with each other, in order to reach agreement in regard to characteristics and mechanisms, and specific values thereof, to be used in transmission and implicit identification of header free packets and other packet types.

FIG. 1 further shows a corresponding node 24, which might also be a mobile unit, linked to network entity 14. Corresponding node 24 is normally not connected directly to network entity 14, but is indirectly connected through a network of nodes. Network entity 14 is provided with a compressor 25, and mobile unit 12 is provided with a corresponding decompressor 16. The compressor 25 and decompressor 16 handle incoming traffic to the mobile unit 12, that is, incoming traffic from a corresponding communication node 24.

In a first embodiment of the invention, compressor 18 and decompressor 22 negotiate one or several specific packet sizes which will be used to identify header free packets. This is possible, since a 0-byte header compression, to provide a header free packet, is only usable over specific links with certain characteristics, and only advantageous for applications that suit the link characteristics. One of the specific packet sizes should be the minimum size expected. When a packet is sent to the compressor, the compressor decides which packet type to use. If the payload of the packet has a size which is one of the negotiated packet sizes, and no header is needed for the packet, the compressor sends the packet without a header. Otherwise, a header including an explicit packet type identifier is added to the payload which is sent.

Decompressor 22 always treats a packet of any of the specific pre-negotiated sizes as a packet without a header, and makes use of context information and link synchronization to decompress the header. As is known, context information is information received from previously sent packets in the same packet stream or flow. If a packet transmitted to the decompressor is not one of the specific sizes, the packet is handled as an ordinary packet with a compressed header containing a packet type identifier and other compressed header fields.

In implementing the above embodiment, the compressor has to ensure that if the size of a packet with a normal compressed header matches any of the specific pre-negotiated sizes for header free packets, padding must be added to the packet, so that its size will no longer match a pre-negotiated size. This is necessary to avoid any ambiguity at the decompressor side.

In a second embodiment of the invention, sets of channel coding combinations are used to provide implicit packet type identification. As is known in the art, transport channels and transport format combinations are characteristics of certain standardized configurable physical layers. Each Transport Channel (TC) is characterized by a specific channel coding scheme, and a Transport Format Combination (TFC) is a combination of transport channels at the physical layer and is defined when a physical sub-channel is set up. Each TFC may be configured to correspond to a packet format in order to apply different channel coding on its various sections. Using these definitions and assuming a physical layer using the above concepts, different transport format combination sets can be pre-identified and used for implicit packet type identification. That is, a particular TFC identifier value can be used to specify a channel coding combination which is required for the transmission of each of a particular packet type.

Figure 2:
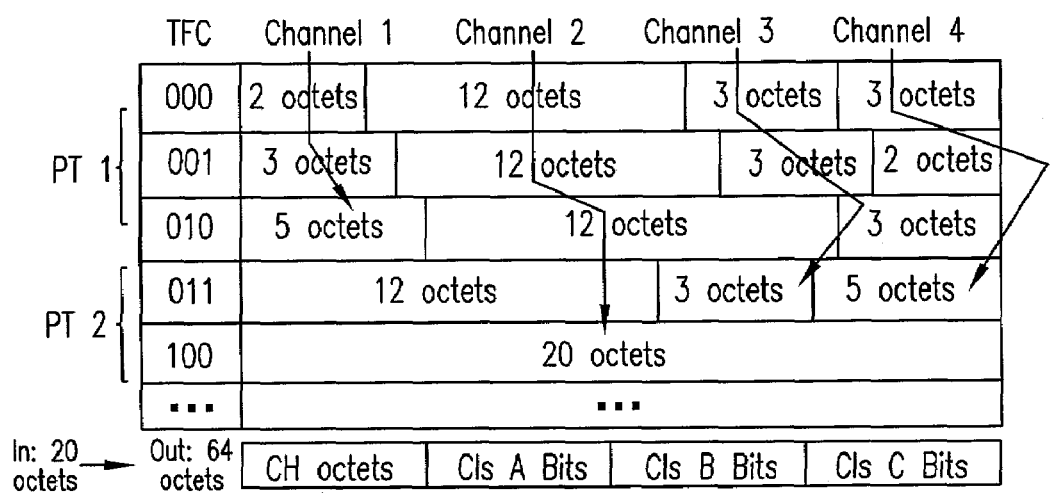
FIG. 2 is a schematic diagram showing an arrangement of transport channels illustrating an embodiment of the invention.

Referring to FIG. 2, there is shown an example wherein transport channels are configured based on a bit classification representing four different possible classes of channel coding requirements. The classes include octets for compressed headers (CH octets) and three arbitrary bit classes (Cls A Bits, Cls B Bits and Cls C Bits). This relates to IP/UDP/RTP/AMR audio traffic channel coding requirements over a configurable physical layer.

If a number of packets all require an identical coding combination, they can all be identified using the same TFC identifier, and various parts of the packets are sent on each transport channel. This allows certain TFC identifiers to be uniquely associated with a particular packet type. For example, referring further to FIG. 2, packets with compressed headers are collectively represented as Packet Type 1, or PT 1. Thus, FIG. 2 indicates that packets with headers would use the TFC identifier values [000, 001, 010]. Header free packets, collectively represented in FIG. 2 as PT 2, would use TFC values [011, 100].

Certain assumptions are required in order for the configurable physical layer concept referred to above to work in conjunction with any header compression mechanism for VoIP. More particularly, it is assumed that the required TFC have already been defined at the physical level, that a channel is provided for the various compressed header sizes (including one for the largest expected compressed header size), that all transport formats required for header free packets are available, and that the resulting set of TFC identifiers for the associated packet flow is made available to the header compression layer. Additionally, it is assumed that the physical layer provides the decompressor with the TFC identifier together with the received packet.

At header compression setup for the second embodiment, the compressor identifies one or several TFC identifiers that should be used for header free-packets. The compressor also agrees with the decompressor that these identifiers should be used for the header free packets. The compressor ensures that all compressed headers are delivered to the physical layer using a TFC identifier as described above.

The decompressor treats a received packet as being a packet without a header, if the received packet has a TFC identifier which is included in the set of identifiers assigned to header free packets, as agreed between the compressor and decompressor. If the decompressor recognizes a received packet as being header free, it makes use of context information and link synchronization to decompress the header. If the TFC identifier of a received packet is not within this set, the packet is handled as an ordinary packet with a compressed header containing a packet type identifier and other header fields. It is to be noted that the compressor must ensure that each compressed header, including headers of 0-byte size, exactly match the defined TFC for the compressed header channel of the TFC identifier for which the packet is delivered. If this is not the case, then the compressor must use padding to produce a compressed header suitable to the TFC to be used for the corresponding packet. The responsibility of defining proper TFC sets belongs to the physical layer.

A third embodiment of the implicit packet type identification invention distinguishes different packet types by using multiplexing options, provided by underlying layers, to create different logical channels. This embodiment could be implemented, for example, by using different service options, different traffic classes or specific QoS parameters.

In accordance with this procedure, the compressor opens two logical channels, using one of the available multiplexing options from the lower layer. The compressor and decompressor negotiate which of the two logical channels will be used for header free packets only, belonging to a single flow, and which channel will be used for packets with compressed headers. The compressor then decides which packet type to use for a particular packet (either with or without a header) and sends the resulting packet on the proper logical channel to the decompressor.

The decompressor always treats a packet received on the logical channel identified for header free packets as a packet without header and makes use of context information and link synchronization to decompress the header. Otherwise, the packet is handled as an ordinary packet with a compressed header containing a packet type identifier and other header fields.

A further embodiment of the invention is directed to a technique which uses a pair of encryption keys to generate, at the physical layer, a packet type identifier for the header compression layer. This method reuses the existing physical layer CRC value, before performing an encryption operation that guarantees the uniqueness of the encrypted value when using a pair of non-identical keys. This method therefore operates at the physical layer, between the physical layer CRC calculation and the physical layer framing operation. As is known by those of skill in the art, CRC is an acronym for Cyclic Redundancy Code, a class of linear error detecting codes which generate parity check bits by finding the remainder of a polynomial division. The encryption operation uses an encryption algorithm which must not contribute to packet size expansion. Accordingly, an available encryption method may be used which uses additive stream ciphers and bit wise xor operations that do not contribute to size expansion. The encryption algorithm also must not propagate bit errors through decryption, which means that the number of erroneous bits before decryption is the same after decryption.

In this embodiment, a pair of encryption keys is first exchanged between the compressor and decompressor sides of the physical link. The key exchange need not be made secure since it is anticipated that another encryption layer will be used at the physical layer. After the key exchange, each encryption key is assigned to a different packet type flow. For example, one key could be assigned to indicate header free packets, and another key could indicate an ordinary packet with a compressed header. A packet is encrypted on the compressor side of the link using the key assigned to its packet type. The encrypted packet is sent through the link to the decompressor side, together with the CRC value computed in conventional manner by the physical layer over the non-encrypted packet. Upon reception at the decompressor side, the received packet is decrypted for each key and a CRC value is computed over the usual data covered by the CRC, using each of the decrypted packets instead of the received encrypted packet. Each of these computed CRC values corresponds to one of the exchanged keys. One of them will be equal to the CRC value received from the compressor side of the link, thereby identifying the key corresponding to the proper logical channel, and thus also identifying the packet type of the received packet.

Figure 3:
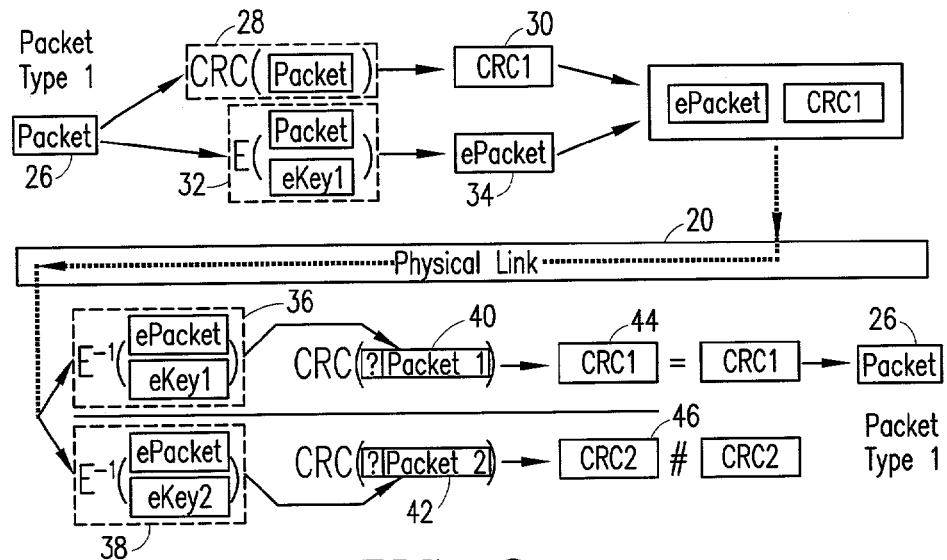
FIGS. 3-4 are schematic diagrams associated with packet encryption collectively illustrating a further embodiment of the invention.
Figure 4:
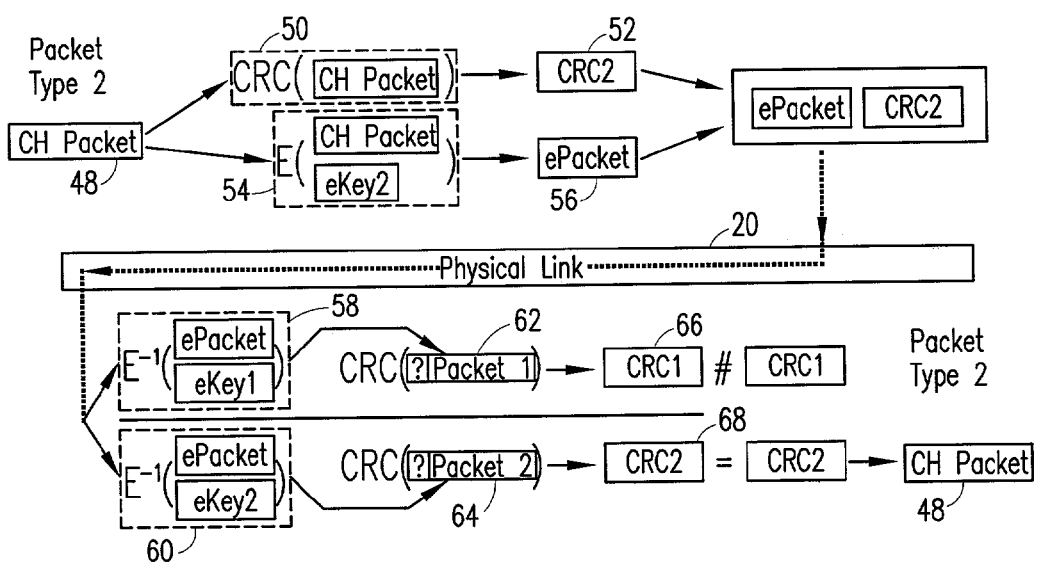

FIGS. 3 and 4 show an example of this procedure, for two different packet types. Referring to FIG. 3, there is shown a header free packet 26, or Packet Type 1, on the compressor side of physical link 20. A CRC value is first calculated as usual by the physical layer, at function block 28, to provide a CRC value of CRC 1, block 30. Before framing and transmission, the packet 26 is encrypted, at function block 32, using the key assigned (eKey 1) to this packet type flow to provide encrypted packet (ePacket) 34. CRC 1 and ePacket 34 are then sent over the physical medium 20 to the decompressor side. At the receiving end ePacket 34 is decrypted with eKey 1 and eKey 2, at function blocks 36 and 38, respectively, thus generating packets 40 and 42 of initially unknown type, (? Packet 1) and (? Packet 2). CRC values are then computed for each of the decrypted packets 40 and 42, yielding the CRC values shown at 44 and 46, CRC 1 and CRC 2, respectively. These values are then compared to the received CRC value, shown at block 30. In this case, CRC value 44 (CRC 1) is equal to the received CRC value, thus identifying the packet type as PT 1.

Referring to FIG. 4, there is shown the same procedure applied to a packet 48 of a different packet type, such as a compressed header packet (CH Packet) or Packet Type 2. A CRC value is calculated at function block 50 to provide a CRC value 52, of CRC 2. The packet 48 is encrypted using the key (eKey 2) assigned to PT 2 to provide encryption packet (ePacket) 56. CRC 2 and ePacket 56 are then sent over link 20, and ePacket 56 is decrypted with eKey 1 and eKey 2, at function blocks 58 and 60, respectively. Packets of unknown type 62 and 64 are generated from the decryption, and are used to respectively compute CRC value 66 which is CRC 1, and CRC value 68 which is CRC 2. By comparing the CRC values with the transmitted CRC value 52, it is determined that packet 48 is PT 2.

The procedure illustrated in FIGS. 3 and 4 can be briefly summarized as follows:

1. Both sides of the link, below the header compression sub-layer, negotiate the use of a pair of encryption keys together with an encryption algorithm and assign a logical value to each key.

2. The compressor then decides which header and packet type to use and sends the resulting packet encrypted using the key corresponding to the selected packet type.

3. At the sending end, the CRC value is computed according to conventional practice over the usual CRC coverage.

4. The packet to be transmitted is then encrypted using the key assigned to its packet type. The resulting encrypted value is then sent over the physical channel, together with the CRC value corresponding to the non-encrypted data.

5. At the receiving end, the CRC value is extracted, the received packet is decrypted using both keys, and a CRC is then computed over each decrypted value over the usual CRC coverage. This yields two new values, CRC 1 and CRC 2. The received CRC is then compared to the new computed values CRC 1 and CRC 2, and the value matching the received value indicates which encryption key was used, thereby identifying the packet type.

6. For the case of the no header/header distinction, the decompressor always treats the packet received and the logical channel identified for header free packets as a packet without a header, and makes use of context information and link synchronization to decompress the header. Otherwise, the packet is handled as an ordinary packet with a compressed header with a packet type identifier and other header fields.

It is to be noted that a pair of different CRC polynomials could also have been suggested, but such polynomials cannot guarantee that there would always be only one unique value generated at the CRC calculation using the same data but different polynomials, for any date. Encryption algorithms provide this guarantee.

Obviously, many modifications and variations of the present invention are possible in light of the above teachings. It is therefore to be understood that within the scope of a disclosed concept, the invention may be practiced otherwise than as has been specifically described.

What is claimed is:

1. In a system for transmitting packets over a link between a compressor and a decompressor, a method of implicit packet type identification comprising the steps of:
   selecting a set of implicit packet transmission characteristics, comprising at least first and second distinguishably different transmission characteristics and further selecting a number of specific packet sizes for use only with header free packets, wherein said compressor uses one of said specific packet sizes to transmit only header free packets;
   operating said compressor to
      compress a header of a first packet type so that the first packet type becomes header free and to
      assign said first transmission characteristic to packets of the first packet type, the compressor further operating to assign said second transmission characteristic to packets of a second packet type which is different from said first packet type; and operating said decompressor to detect said transmission characteristics of packets received by said decompressor, and to thereby identify a received packet as being either the first packet type or the second packet type.

2. The method of claim 1 wherein said selecting step comprises a pre-negotiation between said compressor and said decompressor.

3. The method of claim 1 wherein said selecting step comprises selecting different packet sizes for said first and second packet types.

4. The method of claim 1 wherein said selecting step comprises selecting different sets of channel coding combinations for said first and second packet types.

5. The method of claim 1 wherein said selecting step comprises selecting multiplexing options to create different logical channels for said first and second packet types.

6. The method of claim 1 wherein said selecting step comprises selection of a set of encryption keys with an encryption algorithm, and said compressor assigning different encryption keys to said first and second packet types.

7. The method of claim 1 wherein said system is disposed to compress and decompress packet headers in accordance with a scheme selected from a group of header compression/decompression schemes comprising [VJ], [IPHC], [CRTP], [LLA] and [ROHC].

8. The method of claim 1 wherein said selecting step comprises selecting N different packet transmission characteristics for respectively identifying the packets of N different packet types.

9. The method of claim 1 wherein said second packet type comprises packets which have headers.

10. In a system for transmitting packets over a link between a compressor and decompressor, which respectively compresses packet headers before and decompresses packet headers after transmission, a method of implicit packet type identification comprising the steps of:
   selecting a set of implicit packet transmission characteristics, wherein different characteristics of said set of implicit packet transmission characteristics identify packets of different types and further selecting a number of specific packetsizes for use only with header free packets, wherein said compresser uses one of said specific packet sizes to transmit only header free packets;
   compressing the header of a particular packet so that said particular packet becomes header free, said particular packet being of a type identified by a corresponding one of said characteristics;

transmitting said particular packet over said link from said compressor to said decompressor; and operating said decompressor to detect said corresponding characteristic and to thereby identify said particular packet as being a header free packet type.

11. The method of claim 10 wherein:

said selecting step comprises selecting a set of channel coding combinations; and one of said channel coding combinations is assigned only to header free packets and another of said channel coding combinations is assigned only to packets of another specified type.

12. The method of claim 10 wherein:

said selecting step comprises selecting multiplexing options to create different logical channels, only header free packets being sent on one of said logical channels, and only packets of another specified type being sent on another of said logical channels.

13. The method of claim 10 wherein:

said selecting step comprises selection of a set of encryption keys with an encryption algorithm, one of said keys being assigned only to header free packets, and another of said keys being assigned only to packets of another specified type.

14. The method of claim 10 wherein:

said selecting step comprises a pre-negotiation between said compressor and said decompressor.

15. A system for transmitting packets over a link comprising:

a compressor for compressing a header of a first packet type so that the first packet type becomes header free and for assigning a first transmission characteristic from a set of implicit packet transmission to packets of the first packet type, and to assign a second transmission characteristic to packets of a second packet type which is different from said first packet type, means for selecting a number of specific packet sizes for use only with header free packets where said compresser uses one of said specific packet sizes to transmit only header free packets; and a decompressor at the opposing side of said link disposed to detect said transmission characteristics of packets received by said decompressor. and to thereby identify a received packet as being either said first packet type or said secondpacket type.

16. The system of claim 15 wherein said compressor and said decompressor pre-negotiate packet characteristics.

17. The system of claim 15 wherein, and said second packet type comprises packets with headers.

18. The method of claim 15 wherein said compressor assigns different packet sizes for said first and second packet types.

19. The method of claim 15 wherein different sets of channel coding combinations are assigned for said first and second packet types.

20. The system of claim 15 further comprising means for selecting multiplexing options to create different logical channels wherein said first and second packet types are each sent on a different logical channel.

21. The system of claim 1 wherein said compressor assigns different encryption keys to said first and second packet types from a set of encryption keys that are determined utilizing an encryption algorithm.

22. In a system for transmitting packets over a link between a compressor and an opposite party, a method of implicit packet type identification comprising the steps of:

selecting a number of specific packet sizes for use only with header free packets, wherein said compresser uses one of said specific packet sizes to transmit only header free packets;

selecting a set of implicit packet transmission characteristics, comprising at least first and second distinguishably different transmission characteristics;

compressing the header of a first packet type so that the first packet type becomes header free and assigning the first transmission characteristic to packets of a first packet type; and assigning said second characteristic to packets of a second packet type which is different from said first packet type.

23. The method of claim 22 wherein said selecting step comprises a pre-negotiation between said compressor and said opposite party.

24. The method of claim 22 wherein said selecting step comprises selecting different packet sizes for said first and second packet types.

25. The method of claim 22 wherein said selecting step comprises selecting different sets of channel coding combinations for said first and second packet types.

26. The method of claim 22 wherein said selecting step comprises selecting multiplexing options to create different logical channels for said first and second packet types.

27. The method of claim 22 wherein said selecting step comprises selection of a set of encryption keys with an encryption algorithm, from which compressor assigns different encryption keys to said first and second packet types.

28. The method of claim 22 wherein said system is disposed to compress packet headers in accordance with a scheme selected from a group of header compression schemes comprising [VJ], [IPHC], [CRTP], [LLA] and [ROHC].

29. The method of claim 22 wherein said selecting step comprises selecting N different packet transmission characteristics for respectively identifying the packets of N different packet types.

30. The method of claim 22 wherein said second packet type comprises packets which have headers.

31. In a system for transmitting packets over a link between a communicating party and a decompressor, a method of implicit packet type identification comprising the steps of:

selecting a set of implicit packet transmission characteristics, comprising at least first and second distinguishably different transmission characteristics, wherein the first transmission characteristic is associated with a first packet type that is header free and the second transmission characteristic is associated with a second packet type which is different from the first packet type; and selecting a number of specific packet sizes for use only with header free packets, wherein said communicating party uses one of said specific packet sizes to transmit only header free packets; and operating said decompressor to detect said transmission characteristics of packets received by said decompressor to thereby identify a received packet as being either the first or second packet type.

32. The method of claim 31 wherein said selecting step comprises a pre-negotiation between said communicating party and said decompressor.

33. The method of claim 31 wherein said selecting step comprises selecting different packet sizes for said first and second packet types.

34. The method of claim 31 wherein said selecting step comprises selecting different sets of channel coding combinations for said first and second packet types.

35. The method of claim 31 wherein said selecting step comprises selecting multiplexing options to create different logical channels for said first and second packet types.

36. The method of claim 31 wherein said selecting step comprises selection of a set of encryption keys with an encryption algorithm, and using different encryption keys for said first and second packet types.

37. The method of claim 31 wherein said system is disposed to decompress packet headers in accordance with a scheme selected from a group of header compression/decompression schemes comprising [VJ], [IPHO], [CRTP], [ELLA]and [ROHC].

38. The method of claim 31 wherein said selecting step comprises selecting N different packet transmission characteristics for respectively identifying the packets of N different packet types.

39. The method of claim 31 wherein said first packet type comprises header free packets. and said second packet type comprises packets which have headers.

* * * * *